June 10, 1924.
W. WEBER
LOADING AND UNLOADING TRUCK
Filed Dec. 31, 1921
1,497,622
8 Sheets-Sheet 5
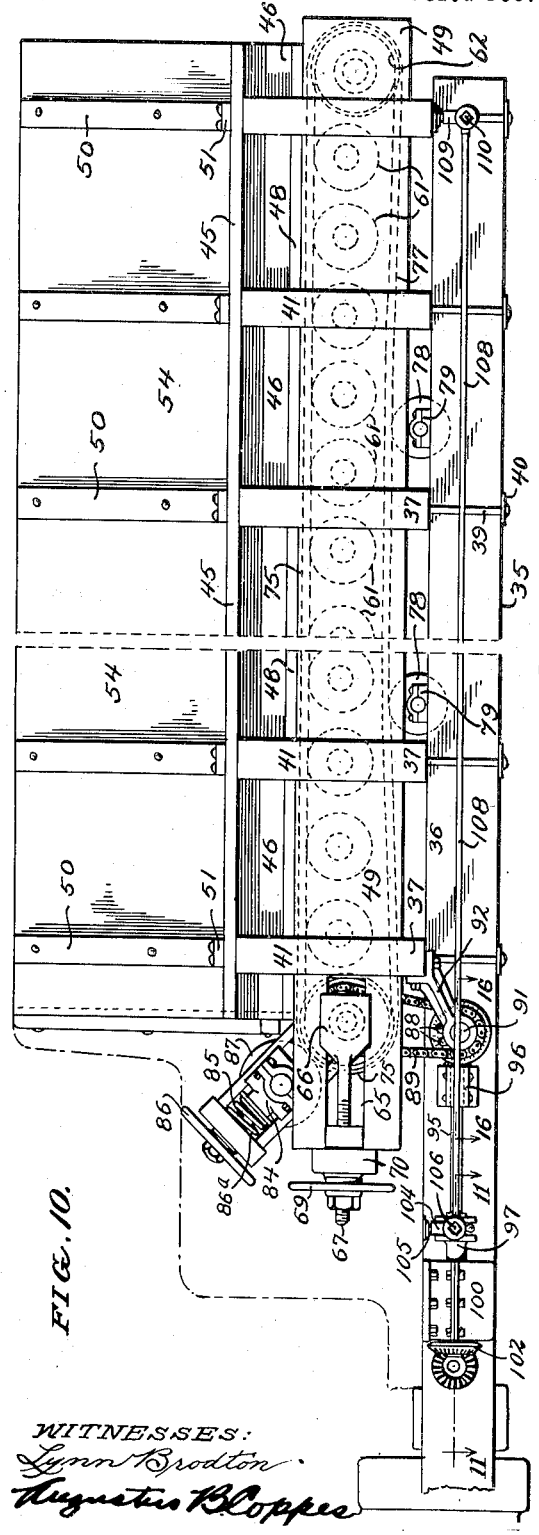
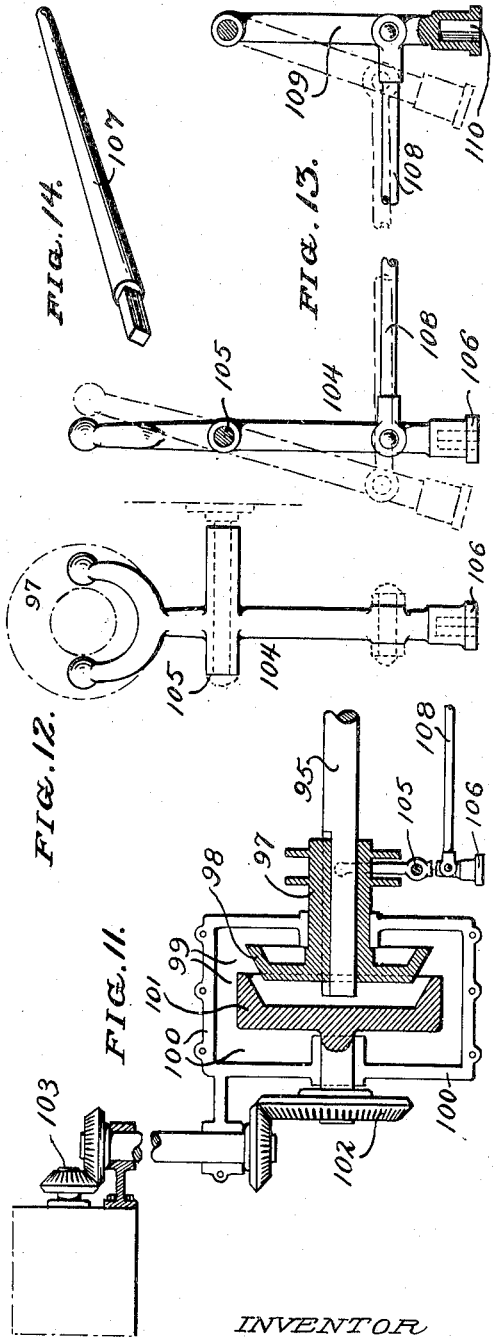
WITNESSES:
Lynn Brodton
Augustus B. Coppes
INVENTOR
William Weber
by Joshua R. H. Potts
his ATTORNEY

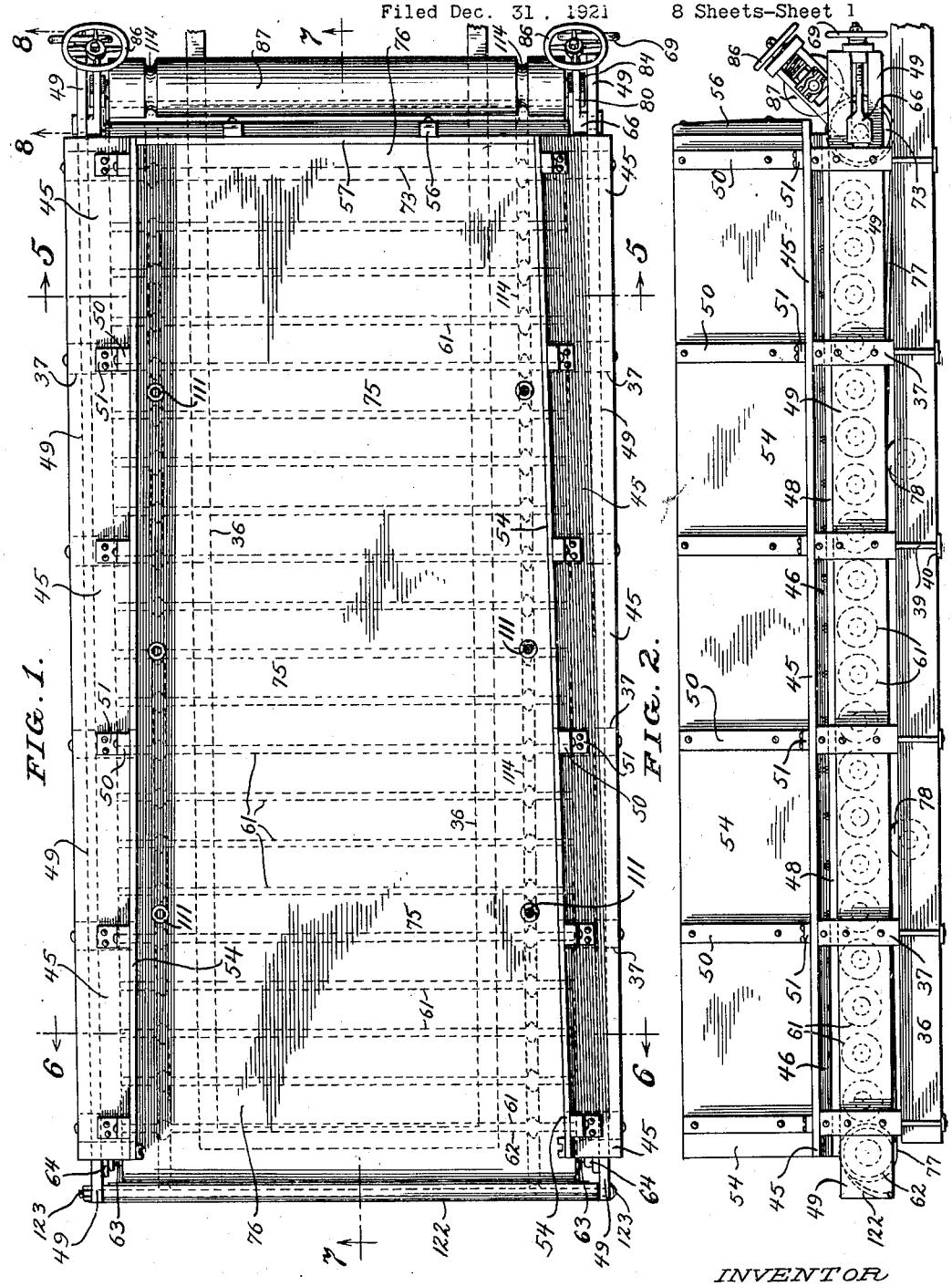

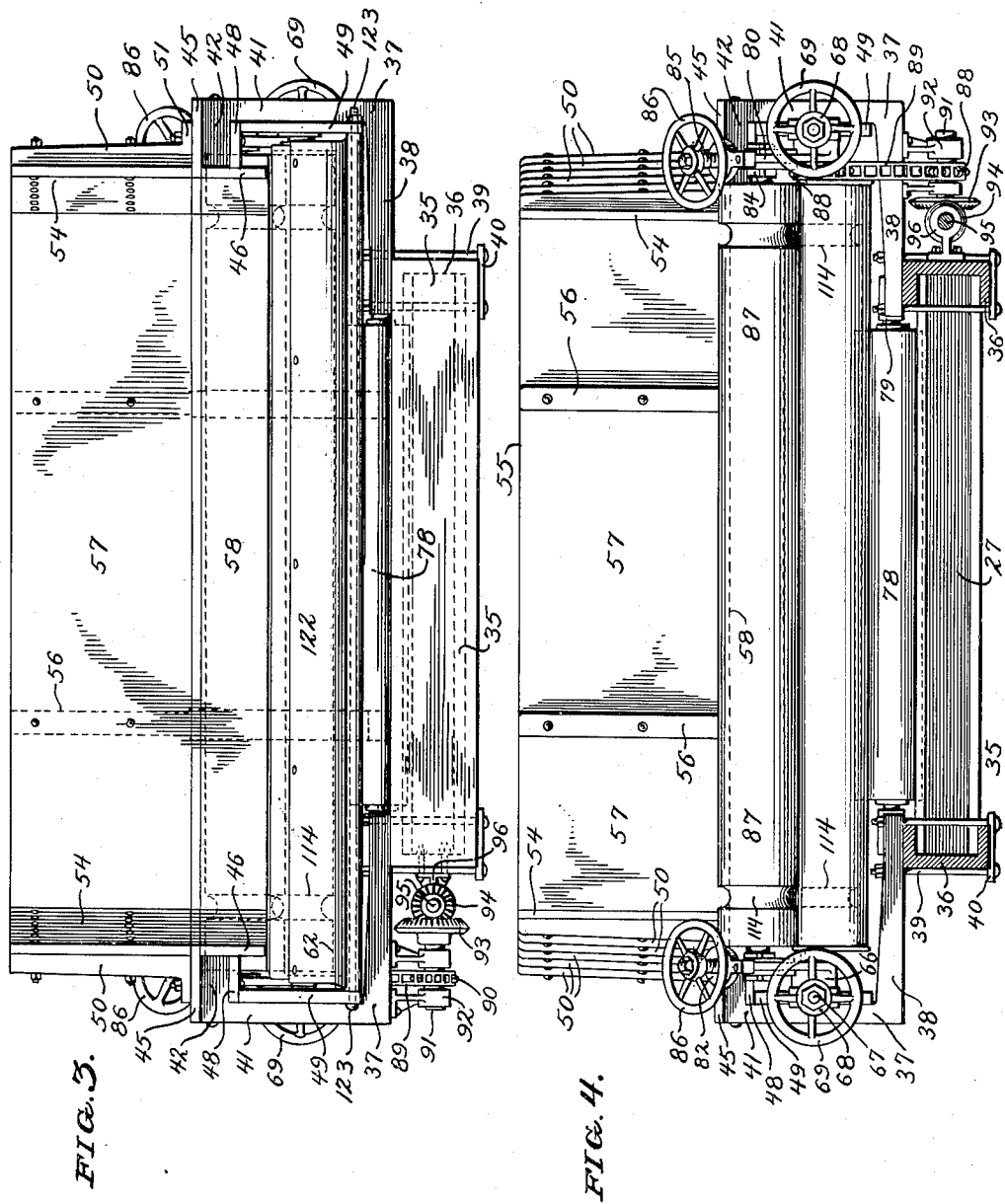

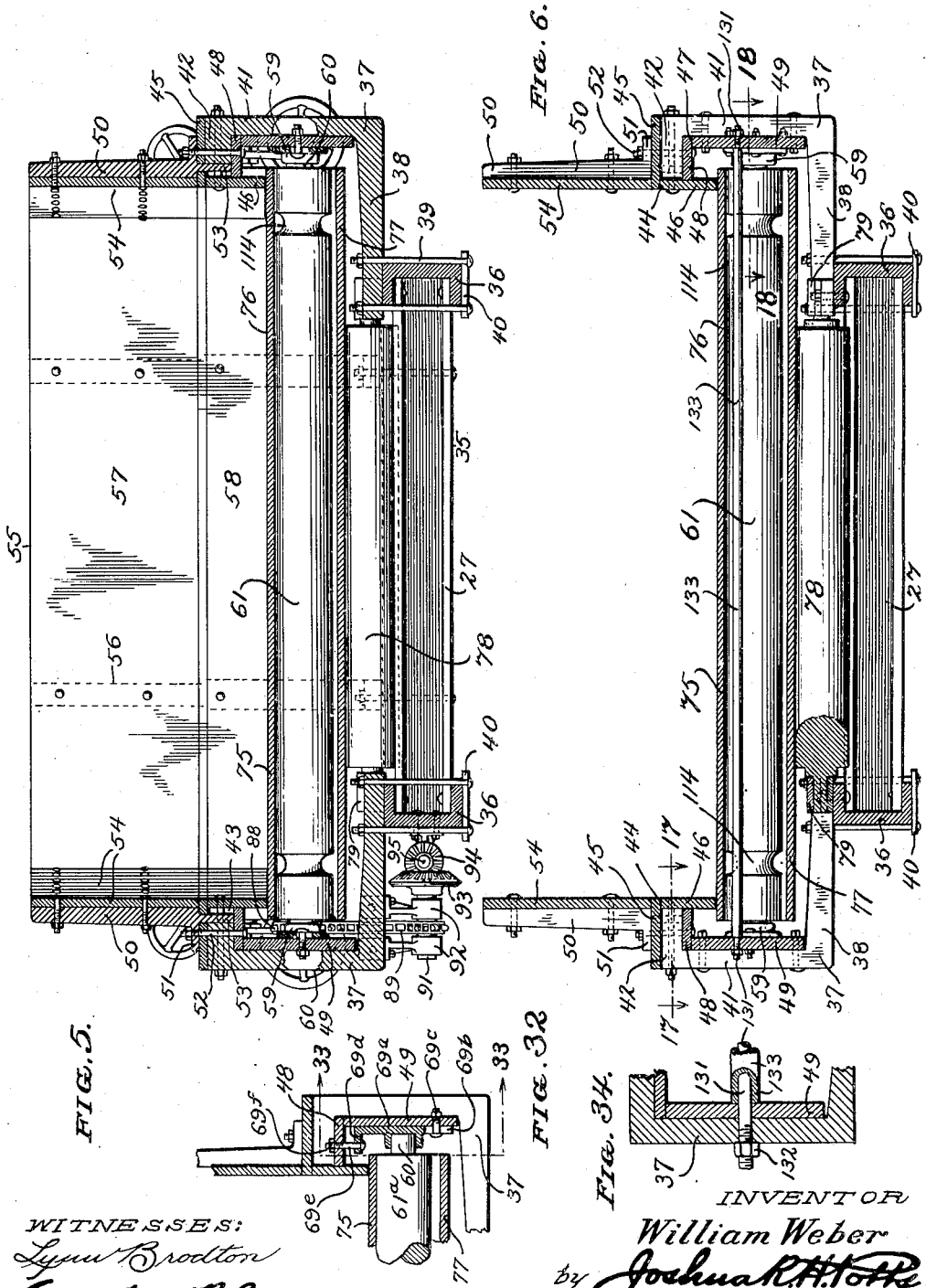

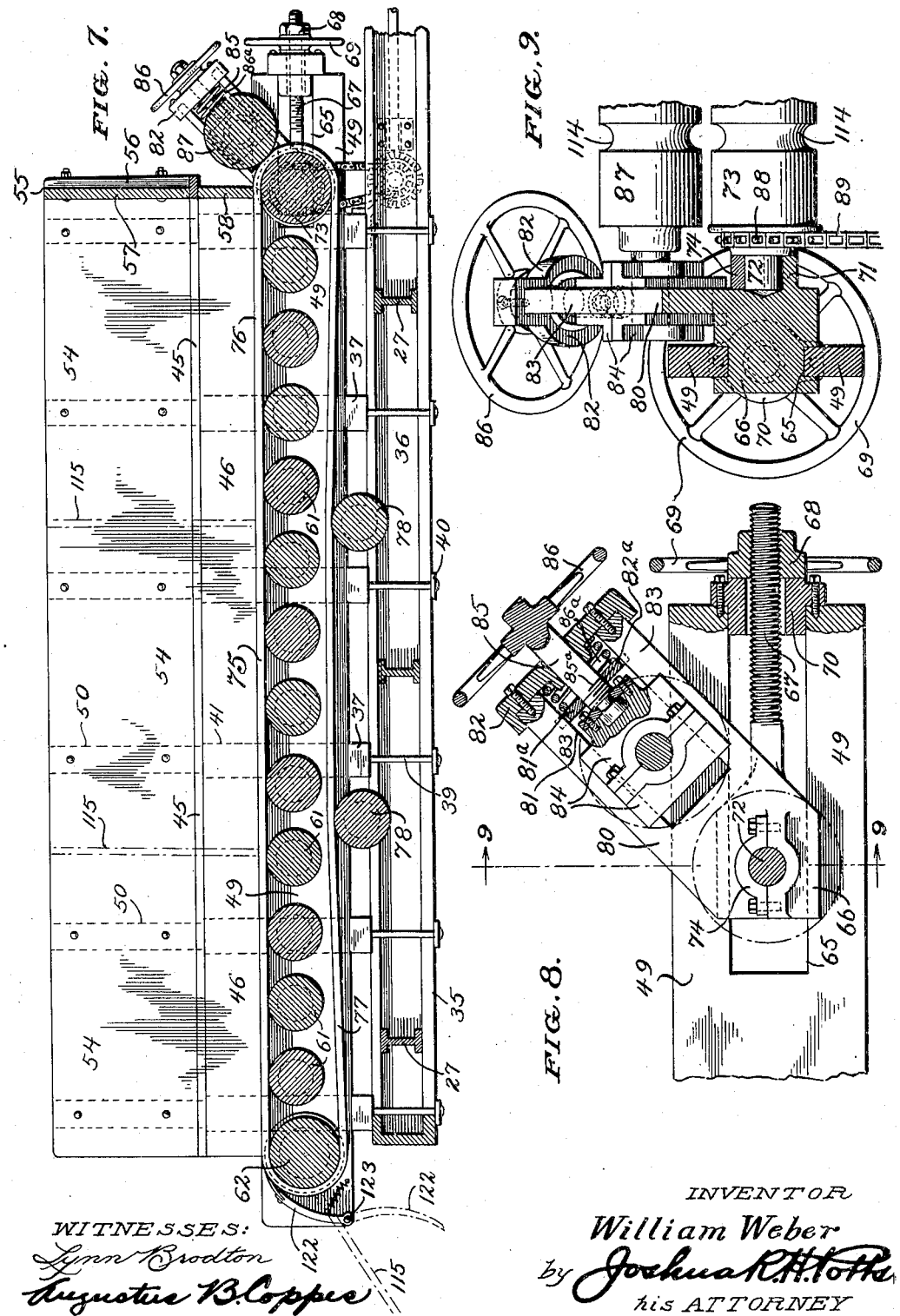

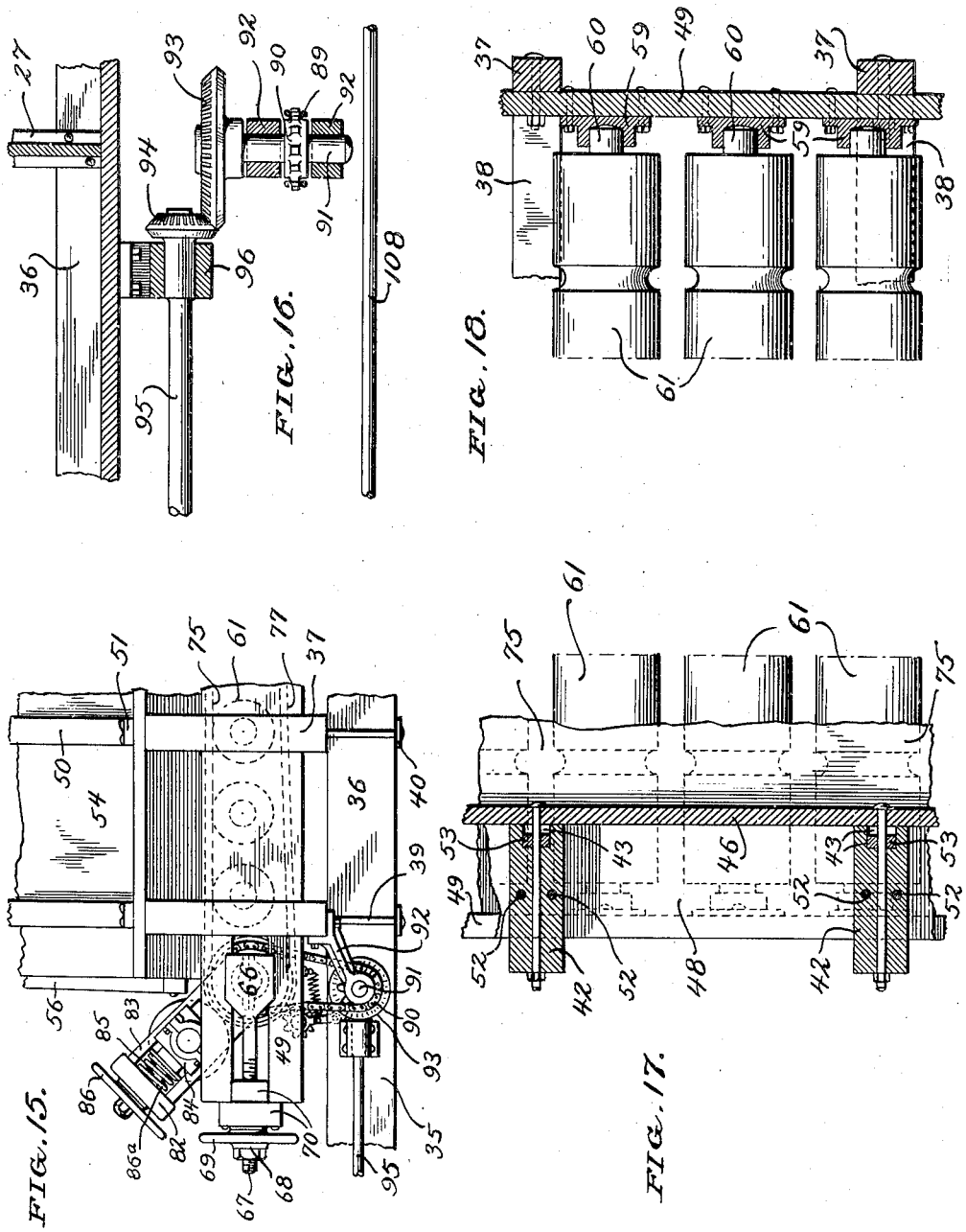

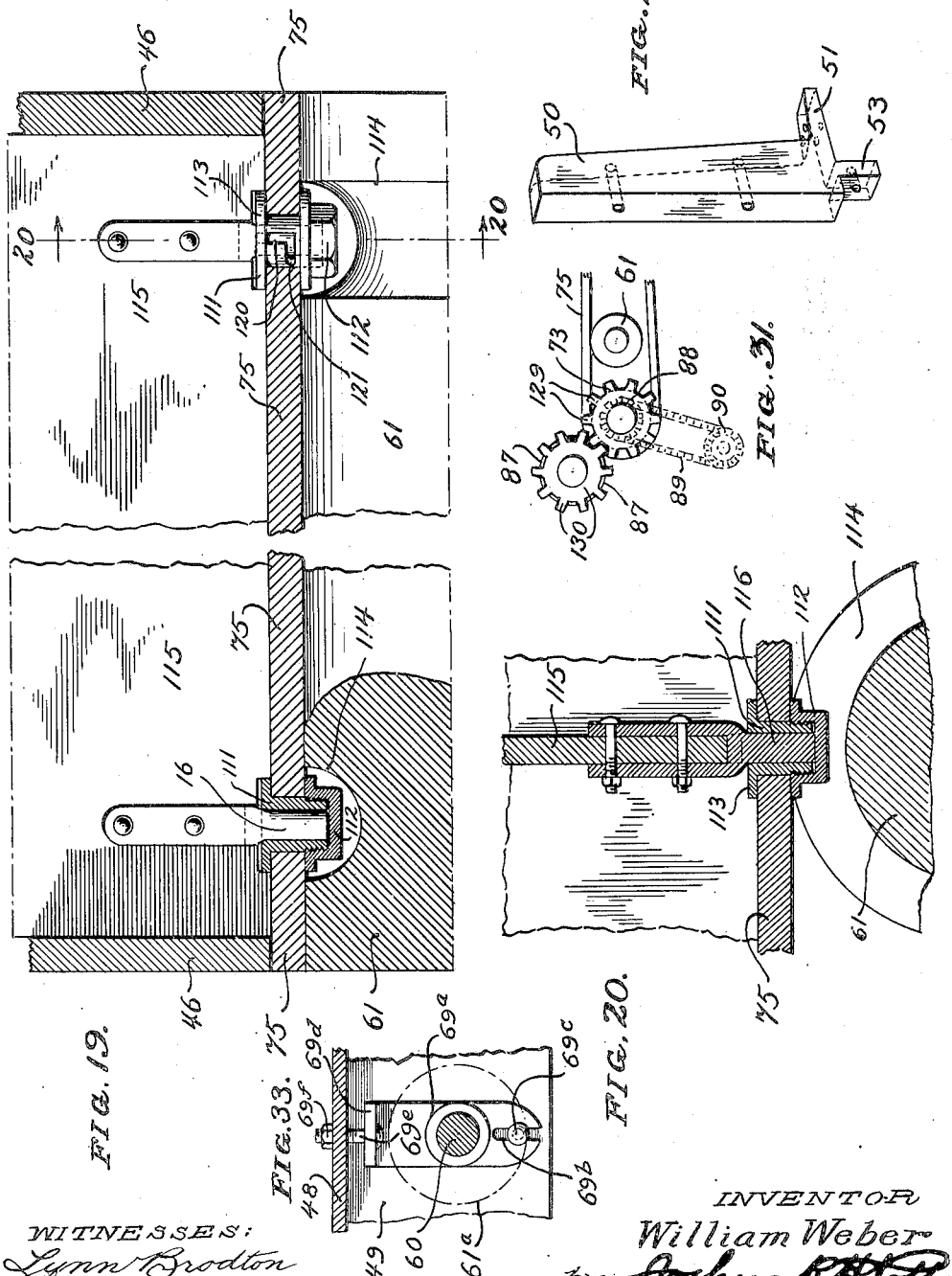

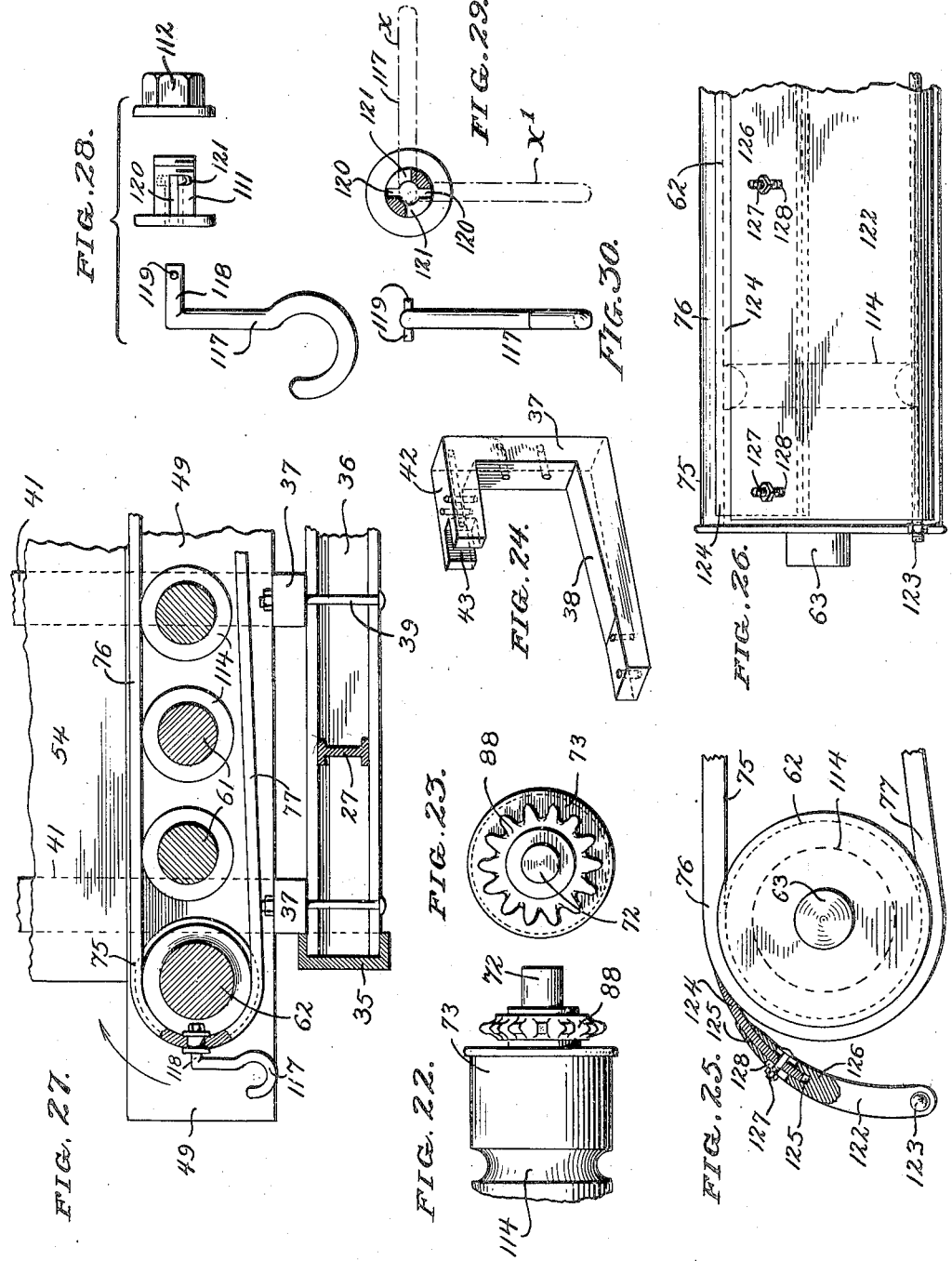

Patented June 10, 1924.

1,497,622

UNITED STATES PATENT OFFICE.

WILLIAM WEBER, OF ALLENTOWN, PENNSYLVANIA.

LOADING AND UNLOADING TRUCK.

Application filed December 31, 1921. Serial No. 526,209.

*To all whom it may concern:*

Be it known that I, WILLIAM WEBER, a citizen of the United States, residing at Allentown, in the county of Lehigh and State of Pennsylvania, have invented certain new and useful Improvements in Loading and Unloading Trucks, of which the following is a specification.

One object of my invention is to provide an improved hauling truck, such for example as an automobile truck, which can be used with convenience for loading and unloading material by power driven mechanism, such for example as from power derived from the motor of the truck which is necessary to provide power for propelling the truck.

Another object is to so construct my improved truck that material can be easily discharged therefrom; the arrangement being such that various kinds of material can be kept separated and successively discharged and for this reason my improved truck is particularly adapted for hauling various kinds of building materials; the parts being so arranged that the various kinds of the material can be kept independent from each other while being transported.

A further object is to make my invention of a strong and durable construction which will not readily get out of proper working order.

A still further object is to provide improved means for compensating for wear on the various parts.

Another object of my invention is to provide means operative either from a position adjacent the front or rear of the truck for effecting discharge of material or the loading of material thereon.

These objects, and other advantageous ends which will be described hereinafter, I attain in the following manner, reference being had to the accompanying drawings in which—

Figure 1 is a top plan view of a truck made in accordance with my invention,

Figure 2 is a side elevation of said truck; the ground-engaging wheels and associated features being omitted for clearness, Figure 3 is a rear elevation of said truck, Figure 4 is a front elevation of said truck.

Figure 5 is a transverse section taken on the line 5—5 of Figure 1,

Figure 6 is a transverse section taken on the line 6—6 of Figure 1,

Figure 7 is a longitudinal sectional elevation taken on the line 7—7 of Figure 1; the conveyor belt bottom being shown in outside view, Figure 8 is an enlarged fragmentary section taken on the line 8—8 of Figure 1, Figure 9 is a section taken on the line 9—9 of Figure 8, Figure 10 is an enlarged side elevation, partly broken away, illustrating the opposite side of the truck from that shown in Figure 2, Figure 11 is an enlarged section taken on the line 11—11 of Figure 10, Figure 12 is an enlarged transverse elevation of certain of the clutch-operating parts illustrated in Figures 10 and 11, Figure 13 is a side view of the structure illustrated in Figure 12, Figure 14 is a perspective view of a hand lever which can be employed for insertion in the sockets either adjacent the front or rear of the truck for operating the clutch, Figure 15 is a fragmentary side elevation substantially similar to a part shown in Figure 10 with the exception that it includes means for taking up any slack in the drive chain if adjustment is made for purposes of placing tension upon the conveyor belt bottom, Figure 16 is a fragmentary section of a part of the driving means and clutch control means; said section being taken on the line 16—16 of Figure 10, Figure 17 is an enlarged section taken on the line 17—17 of Figure 6, Figure 18 is an enlarged section taken on the line 18—18 of Figure 6, Figure 19 is a fragmentary enlarged tranverse section illustrating connections for dividing partitions relatively to the conveyor belt bottom, Figure 20 is a section taken on the line 20—20 of Figure 19, Figure 21 is a perspective view of one of the side posts for the truck body, Figure 22 is a fragmentary end view of the driving roller for the conveyor belt bottom, Figure 23 is an end view of Figure 22, Figure 24 is a perspective view of one of the side connecting brackets, Figure 25 is a detail elevation, partly in section, showing a combined a scraper and guard which I preferably employ at the rear end of the truck for co-action with the conveyor belt bottom, Figure 26 is a fragmentary rear elevation of the structure shown in Figure 25, Figure 27 is a fragmentary longitudinal section showing a loading hook secured to the conveyor belt bottom and which may be employed for loading material upon the truck, Figure 28 is a detached view showing a socket construction and hook; said construction allowing the hook to be secured to the conveyor belt bottom in the manner shown in Figure 27.

Figure 29 is a fragmentary section of the socket showing in dot-and-dash lines, positions assumed by the hook during the insertion and removal of the hook, Figure 30 is a front elevation of the hook, Figure 31 is an elevation showing diagrammatically a slight modification in certain of the features of my invention, Figure 32 is a fragmentary transverse sectional elevation showing a form of bearings for the rollers which I can employ for adjusting the positions of the rollers, Figure 33 is a section taken on the line 33—33 of Figure 32, and Figure 34 is a fragmentary elevation partly in section illustrating certain parts on a larger scale than illustrated in Figure 6 for the purpose of keeping the sides of the truck in proper spaced position.

Referring to the drawings, 35 represents a main frame which is preferably made of metal including side channels 36 and transversely extending beams 27 which are secured together in any suitable manner, such for example as by riveting, and this frame may be of any suitable dimensions and can be mounted in the same manner as an automobile frame structure; the ground-engaging wheels and other parts of the truck serving as a support for the main frame being omitted from the drawings for sake of clearness.

A number of brackets 37, as shown in detail in Figure 24, are arranged in spaced distances apart relatively to the length of the channels 36 and these brackets have inwardly extending arms 38 which are secured by tie rods 39 to the side channels 36; said arms resting on the top surfaces of the side channels with the bolts or tie rods 39 connecting with cross hanger members 40 under the side channels 36, as clearly shown in Figure 5.

The brackets 37 have upright portions 41; said portions 41 adjacent their tops having inwardly extending heads 42; said heads at their inner ends being bifurcated to provide notches 43. Elongated angles 44 have top plate portions 45 which rest on the heads 42 and side plate portions 46 which depend from the parts 45 and provide parts of the sides of the truck body. Other angles 47 extend longitudinally under the angles 44 within the confines of the brackets 37 and have plate portions 48 directly under the heads 42 and preferably in abutment with the plate portions 46 of the angles 44. The upright portions 49 of the angles 47 are bolted to the upright portions 41 of the brackets. The plate portions 45 of the angles 44 serve to support posts 50 which are arranged in spaced distances apart from front to rear of the truck body. Said posts have foot portions 51 which are secured by bolts 52, which bolts pass through the plate portions 45 of the angles 44, through the heads 42 of the brackets and through the plate portions 48 of the angles 47. The posts 50 also have depending tenons 53 which extend through slots in the plate portions 45 of the angles 46 and into the notches 43 of the heads 42 of the brackets 37.

Side plates 54 are secured to the inner surfaces of the posts in alignment with the plate portions 46 of the angles 44. The front end 55 of the truck body also includes posts 56 of generally similar construction to the posts 50 and front plates 57 and 58 which are in alignment with the side plates 54 and plate portions 46. The plate portions 46 and sides 54 converge slightly from the rear end of the body toward the front end, as clearly shown in Figures 1 and 5, and to provide this arrangement the top plate portions 45 of the angles 46 flare forwardly and are therefore slightly narrower at their rear ends than at their forward ends as shown in Figure 1. The plate portions 49 of the angles 47, however, are arranged parallel so as to form supports for bearings 59 which are adjustably bolted to the inner surfaces of the plate portions 49 so that they can be raised for a purpose hereinafter made obvious; said bearings taking the form of sockets in which are positioned the end trunnions 60 of a number of rollers 61. These rollers 61 extend transversely under the sides of the body, as clearly shown in Figures 5 and 6.

A transversely extending rear roller 62 also has its opposite end trunnions 63 fitting within socket bearings 64 secured to the inner surface of the plate portion 49 as clearly shown in Figure 1. This roller 62 is preferably made slightly larger in diameter than the roller 61. The plate portions 49 of the angles 47 are extended adjacent their forward ends beyond the front ends of the plate portions 48 and these extensions of the plate portions 49 are bifurcated to provide inwardly extending notches or slots 65 in which slide bearing blocks 66, as clearly shown in Figures 8 and 9. These bearing blocks have forwardly extending screw threaded stems 67 which pass through screw threaded holes in the hubs 68 of adjusting wheels 69. The forward ends of the slots 65 are closed by filler pieces 70 which are secured to the forward ends of the plate portions 49 and said filler pieces serve as abutting members for the hub portions 68 of the adjusting wheels 69. The inner sides of the bearing blocks 66 having bearing portions 71 for the trunnions 72 of a driving roller 73; the portions 71 including removable bearing caps 74 to allow the trunnions to be inserted or removed from the bearing portions 71. It will thus be understood that by turning the adjusting wheels 69 that the roller 73 can be moved forward away from the rollers 61 and 62.

A strong flexible belt 75, which is made endless, passes around the rollers 62 and 73 and has its upper run 76 positioned above the rollers 61 and its lower run 77 positioned below the rollers 61. This belt is of such width as to pass under the parts 48 of the sides of the body and serves as a bottom for the body. Supporting rollers 78 are positioned transversely under the bottom run 77 of the belt 75 and these rollers 78 have opposite end trunnions mounted in bearings 79 which are secured to the upper surfaces of the channels 36 of the main frame 35.

The bearing blocks 66 have upwardly and forwardly slanting integral portions 80, as clearly shown in Figures 8 and 9, and the upper parts of these portions 80 are bifurcated to provide slots or notches 81; the upper ends of said slots being closed by a filler piece 82 which is bolted to the furcations 83. Bearing members 84 are slidably positioned within the slots 81 and like the bearing block 66 have portions slidably embracing the interposed side surfaces of the furcations so that while the members 84 are slidable within the slots 81 they cannot move laterally therein. The filler pieces 82 have holes through which smooth portions of the stems 85 slidably fit; said stems being secured rigidly to adjusting wheels 86.

The inner ends of the stems are rotatably secured within the bearing members 84. The stems 85 have screw threaded portions 85ᵃ which fit in screw threaded holes 82ᵃ in follower blocks 81ᵃ. These follower blocks are slidably mounted in the notches or slots 81 and have portions embracing the furcations 83. Coiled springs 86ᵃ are interposed between the follower blocks and the filler pieces 82. The springs 86ᵃ will tend to move the bearing members downwardly at a slant. The bearing members are preferably made in sections and form journal bearings for the opposed trunnions of an upper transversely extending pressure or clamping roller 87. Thus by the springs 86ᵃ, the roller 87 will be moved downward at a slant in a position in front of the front end of the body of the truck, as shown in Figure 7 to firmly but resiliently hold the belt 75 in engagement with the driving roller 73. If it is desired to increase or decrease the pressure of the springs, the hand wheels 86 can be turned to vary the tension. It will be further noted that by turning the adjusting wheels 69 that the entire structure including the rollers 73 and 87 and their connecting means can be moved forward to apply tension to the belt 75 without disturbing the pressure of the roller 87 against the belt.

The driver roller 73 adjacent one end trunnion has a sprocket wheel 88 thereon which is connected by a drive chain 89 with another sprocket 90 secured to a shaft 91. The shaft 91 has bearings in brackets 92 which are secured to one of the side brackets 37 adjacent the front of the truck body and at one side thereof. The shaft 91 has a bevel gear 93 secured thereto which meshes with another bevel gear 94 on a longitudinally extending shaft 95; said shaft being mounted in bearings 96 which are secured to the side of the main frame, as shown in Figure 16. The shaft 95 adjacent its forward end has a collar 97 slidably keyed thereto and to this collar is secured one part 98 of a clutch 99; said clutch being preferably mounted in a housing or box 100 as shown in Figure 11. The other part 101 of the clutch has secured to it a bevel gear wheel 102 and this bevel gear is in geared connection with any source of power such for example as the shaft 103 which may represent a transmission shaft adapted to be connected with the motor such for example as an automobile propelling motor of any type.

A clutch shifting device 104, which is pivotally mounted at 105, includes a socket portion 106 adjacent the forward end of the truck body in which a lever, such for example as the lever 107 shown in Figure 14, can be inserted so that the clutch can be moved to throw the member 98 into operative or out of operative engagement with the part 101. The device 104 is connected by a link 108 to a rear socket member 109 and if desired a lever, such as the lever 108, can be inserted in the socket portion 110. This socket member 109 is preferably located adjacent the rear end of the truck body so that a man standing adjacent the rear end of the truck body can operate the clutch without requiring that he walk to the front end since it is sometimes more convenient and desirable that the operator stand adjacent the discharge end of the truck so that if desired he can more readily observe and be of assistance any instant when it is desired to move portions of the load to the extreme end so that the operator can lift the same manually where a dumping of the material would injure or disarrange the same; it being of course understood that when the clutch is thrown into operation the top run of the belt will serve as a conveyor to move any material which is within the body toward the rear end and the action of the belt will be positive in view of the provision of the clamping roller 87 serving to hold the belt in such frictional contact with the roller 73 that the belt will be compelled to move when the roller 73 is operated through the mechanism above described.

It will be also noted that reverse movements of the transmission shaft 103, which can be effected in any suitable manner, will cause the top run of the belt to move in either direction according to the requirements as to their loading or unloading; this action being more specifically described hereinafter.

The belt 75 has sockets 111 secured thereto and preferably being arranged in pairs, transversely opposed to each other as shown in Figures 1 and 19. These sockets are secured in place by cap nuts 112; the sockets having screw threaded portions for engagement with the nuts 112; said sockets also having flanges 113. The various rollers have annular grooves 114 cut therein to provide clearance room for the cap nuts 112. Any number of transverse partitions 115 can be positioned transversely between the sides of the truck body and these partitions have bars 116 projecting downward and adapted to be inserted within the sockets so as to hold the partitions in upright position and so that when the belt moves, the partitions 115 will also move. For example these partitions can be arranged in spaced relation relative to the length of the truck body and the spaces between the partitions can be filled with material of various characters. The conveyor belt bottom can be moved so as to successively discharge the material and it is merely necessary to remove the partitions to allow the discharge of the material when it reaches the rear end of the body or as will be described hereinafter, the partitions will be allowed, under certain conditions, to swing downward following the path prescribed by the rear roller, after which they can be removed while extending downward at a slant.

For the purpose of loading material into the truck, I provide hooks 117 which have angular extensions 118 adapted to fit in the sockets 111 as clearly shown in Figure 27. As a means for securing the hooks against accidental removal from the sockets I provide the angular extensions 118 with pins 119 which, when the angular extensions are inserted within the sockets, are first projected through the slots 120 in the sockets and then turned into an off-set or angular extensions 121 of the slots as shown in Figures 28 and 29. Thus the hooks are locked to the sockets when moved from the position shown in dot-and-dash lines at $x$ in Figure 29 to the position shown in dot-and-dash lines at $x^1$. With the hooks thus attached to the conveyor belt through the medium of the sockets if the upper run of the conveyor belt is moved toward the front of the truck, the hooks can be used to pull, lift or drag material into the body portion of the truck.

I also preferably provide a combined scraper and guard 122 which is pivotally mounted at 123 and is preferably made arcuate including an adjustable portion 124 which is slidably secured in an arcuate slot 125; said arcuate slot being in the portion 126 as clearly shown in Figure 25. A plurality of bolts 127 extend through the part 124 and through holes 128 in the part 126 and these bolts serve to secure the part 124 to the part 126. The upper end of the part 124 is adapted to be positioned adjacent the outer surface of the belt and serves as a scraper so as to prevent quantities of material, which is being hauled, from adhering to the belt. If desired the combined scraper and guard can be swung on its pivotal mounting 123 into a position with the part 124 away from the belt; such position being shown in dot-and-dash lines in Figure 7. When the combined scraper and guard is thus swung away from the belt and if the partitions 115 are being used, said partitions can, upon discharging material, move into inclined positions following the path of the roller 62 and the partitions can then be easily removed since they will be relieved of the weight of the material when said partitions start to move at a slant radially to the axis of the roller 62. The bolts 127, when the upper end of the scraper portion 124 becomes worn, can be loosened and the part 124 can be slid outward and the bolts 127 can again be tightened so as to compensate for wear on the part of the portion 124 which is immediately adjacent the belt.

By having the sides of the body tapering forward there is practically no possibility of the contents of the truck jamming or producing undue friction when the bottom is moved to discharge said contents since the material after first being started toward the rear of the truck will gradually loosen or in other words reduce its pressure against the sides.

With the construction described and illustrated, it will be noted that I am enabled to provide the tapering sides of the truck body and at the same time the portions of the body which provide the mounting for the bearings of the various rollers are parallel so that it is not necessary to provide tapered or any special form of bearings to compensate for the tapering of the sides of the truck body.

In the form of my invention as shown in Figure 31, I have illustrated a gear connection between the driving roller 73 and the pressure roller 87 so that the roller 87 will positively rotate in unison with the roller 73; said connection consisting of a gear wheel 129 connected to the roller 73 and a gear wheel 130 connected to the roller 87 and in mesh with the gear wheel 129. The meshing of these gear wheels is such as to allow for the movement of the roller 87 toward the roller 73 and this can be accomplished by initially setting the intermeshing teeth partway into mesh one with the other so as to allow for the movement of the roller 87 toward the roller 73. However, under ordinary use these gear wheels can be dispensed with since the mere pressure of the roller 87 against the roller 73 is sufficient to firmly hold the belt in contact with the roller 73 so that when the latter is rotated the belt will be moved.

In the bearings for the rollers 61ª as shown in Figures 32 and 33, I have illustrated the bearings at 69ª; said bearings having notches 69ᵇ through which bolts 69ᶜ pass; said bolts being secured to the upright portions 49 of the angle 37 at the side of the truck. The bearings 69ª have lateral extensions 69ᵈ through which bolts 69ᵉ extend; these bolts passing though the plate portions 48 and are provided with nuts 69ᶠ so that when the bolts 69ᶜ are loosened, the nuts 69ᶠ can be turned so as to effect a raising movement of the rollers 61 and belt 75 with respect to the lower edges of the sides of the truck so that if wear occurs on the belt, the same can be compensated for by adjusting the bearings 69 and thus the distance between the lower edges of the sides and the belt can be kept comparatively small.

I have illustrated in Figures 6 and 34, means for keeping the sides of the truck at proper distances apart; said means including an elongated rod or tie bolt 131 which extends through the upright portions 49 of the side angles and through the members 37 and at its outer ends is provided with nuts 132. A pipe 133 embraces the rod 131 between the portions 49 of the sides of the truck and this structure prevents spreading movement of the sides of the truck out of proper position. Any number of these devices can be located within the length of the truck so as to keep said sides of the truck in proper relation to the other parts thereof.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A hauling truck including a body portion having upright sides; a movable bottom; means for moving said bottom in the direction of the length of said body; means providing sockets secured to said bottom and partitions having bars adapted for detachable engagement with said sockets substantially as described.

2. A hauling track including a body portion having upright sides; a movable bottom; means for moving said bottom in the direction of the length of said body; and means for connection to said bottom for the purpose of pulling material into said body when the bottom is moved; substantially as described.

3. A hauling truck including a body with sides spaced apart; a conveyor belt bottom; means for actuating said bottom; and connecting sockets secured to said belt whereby partitions and pulling devices can be connected to the belt; substantially as described.

4. A hauling truck including upright sides converging forwardly; a conveyor belt bottom under said sides and extending transversely thereof; and means for moving said belt bottom in the direction of the length of said body; substantially as described.

5. A hauling truck including upright sides converging forwardly; a conveyor belt bottom under said sides and extending transversely thereof; rollers forming a support for said conveyor belt bottom; and side plates extending parallel and forming a support for the bearings of said rollers; substantially as described.

6. A hauling truck including a body having upright sides; a conveyor belt bottom; a driving roller for said conveyor belt bottom and around which the latter passes; and a pressure roller adapted to compress said conveyor belt bottom into engagement with said driving roller; substantially as described.

7. A hauling truck including a body having upright sides; a conveyor belt bottom; a driving roller for said conveyor belt bottom and around which the latter passes; a pressure roller adapted to compress said conveyor belt bottom into engagement with said driving roller; and means for moving said driving roller and pressure roller to vary the tension of said conveyor belt bottom; substantially as described.

8. A hauling truck including a body having sides spaced apart; a conveyor belt bottom; rollers over which said conveyor belt bottom passes; means for driving one of said rollers; slidable bearings for said driving roller; and means for adjusting the position of said bearings whereby various degrees of tension can be applied to said conveyor belt bottom and an adjustable pressure roller carried by said bearings; substantially as described.

9. A hauling truck including a body having sides spaced apart; a conveyor belt bottom; rollers over which said conveyor belt bottom passes; means for driving one of said rollers; slidable bearings for said driving roller; means for adjusting the position of said bearings whereby various degrees of tension can be applied to said conveyor belt bottom, said slidable bearings having extensions providing guideways; other bearings slidable in said guideways; a pressure roller mounted in said latter bearings; and means for adjusting the position of said latter bearings in the guideways whereby said pressure roller can bear upon the conveyor belt bottom and hold it in engagement with said driving roller; substantially as described.

10. A hauling truck including a conveyor belt bottom; an arcuate guard member for the rear end of said bottom; and a scraping member adjustably secured to said guard member and adapted to occupy a position closely adjacent the outer surface of said conveyor belt bottom; substantially as described.

11. A hauling truck including a movable bottom; and sockets secured to said bottom whereby devices of various kinds can be inserted within said sockets; substantially as described.

12. A hauling truck including a flexible conveyor belt bottom; and securing sockets secured to said bottom; substantially as described.

13. A hauling truck including a flexible conveyor belt bottom; and securing sockets secured to said bottom, said sockets being spaced apart in the direction of the length of said bottom; substantially as described.

14. A hauling truck including a flexible conveyor belt bottom; and securing sockets secured to said bottom, said sockets being spaced apart in the direction of the length of said bottom and also in the direction of the width of said bottom; substantially as described.

15. A hauling truck including a main frame; brackets having outwardly extending arms secured to said main frame and upright portions; plate portions located within the confines of said upright portions; bearings on said plate portions; rollers in said bearings; a conveyor belt supported by said rollers and forming a bottom for the truck body; and sides positioned above said bottom and being supported by said brackets; substantially as described.

16. A hauling truck including a main frame; brackets having outwardly extending arms secured to said main frame and upright portions; plate portions located within the confines of said upright portions; bearings on said plate portions; rollers in said bearings; a conveyor belt supported by said rollers and forming a bottom for the truck body; sides positioned above said bottom and being supported by said brackets, said upright portions having inwardly extending heads; and posts removably secured to said heads and connected to said sides; substantially as described.

17. A hauling truck including a main frame; brackets having outwardly extending arms secured to said main frame and upright portions; plate portions located within the confines of said upright portions; bearings on said plate portions; rollers in said bearings; a conveyor belt supported by said rollers and forming a bottom for the truck body; sides positioned above said bottom and being supported by said brackets, said upright portions having inwardly extending heads; and posts removably secured to said heads and connected to said sides, said sides having depending sections in the form of angles, parts of the angles being secured to said heads of the brackets and serving as a support for the bottoms of said posts; substantially as described.

18. A truck including a body having sides spaced apart; rollers below said body; a belt supported by said rollers and positioned below said body; bearings for said rollers; and means forming a support for said bearings, said bearings being movable vertically to raise the rollers and belt relatively to the sides of the truck body; substantially as described.

19. A hauling truck including a conveyor belt bottom extending in the direction of the length of said truck; a guard member extending into covering position with the rear end of said conveyor belt bottom; and means for connection to said bottom for the purposes of pulling material into said body when the bottom is moved.

In testimony whereof I have signed my name to this specification in the presence of two subscribing witnesses.

WILLIAM WEBER.

Witnesses:
 HARRY D. GANGWER,
 ALLEN STAUFFER,